United States Patent
Wu (10) Patent No.: US 11,710,462 B1
(45) Date of Patent: Jul. 25, 2023

(54) DISPLAY DEVICE WITH BACKLIGHT AND METHOD THEREOF

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/700,478

(22) Filed: Mar. 21, 2022

(51) Int. Cl.
 *G09G 3/34* (2006.01)
 *G02F 1/13357* (2006.01)

(52) U.S. Cl.
 CPC ..... *G09G 3/3406* (2013.01); *G02F 1/133603* (2013.01); *G09G 2310/08* (2013.01); *G09G 2320/0271* (2013.01); *G09G 2320/0285* (2013.01); *G09G 2320/0626* (2013.01)

(58) Field of Classification Search
 None
 See application file for complete search history.

(56) References Cited

U.S. PATENT DOCUMENTS

| | | | |
|---|---|---|---|
| 2021/0020114 A1* | 1/2021 | Lee | G09G 3/342 |
| 2021/0304689 A1* | 9/2021 | Nam | G09G 3/3426 |

* cited by examiner

*Primary Examiner* — Roberto W Flores
*Assistant Examiner* — Donna V Bocar
(74) *Attorney, Agent, or Firm* — JCIPRNET (57) ABSTRACT

The display device that includes a backlight module and a control circuit is introduced. The control circuit divides an input image to a plurality of blocks, calculates a backlight parameter of each of the blocks, calculates a first duty cycle shift and a second duty cycle shift according to a plurality of duty cycles in the backlight parameter, calculates a first weight value and a second weight value according to a maximum duty cycle, a minimum duty cycle, and a duty cycle mean, and calculates a peaking duty cycle the first duty cycle shift, the second duty cycle shift, the first weight value and the second weight value. The control circuit is further configured to generate an output backlight parameter according to the peaking duty cycle, wherein the corresponding lighting unit of the backlight module is driven according to the output backlight parameter.

19 Claims, 5 Drawing Sheets

DISPLAY DEVICE WITH BACKLIGHT AND METHOD THEREOF

BACKGROUND

Technical Field

The disclosure generally relates to a display device, and more particularly relates to a method and display device with backlight module having a capability of improving display quality of the display device.

Description of Related Art

A liquid crystal display (LCD) device usually includes a backlight module that is configured to produce illumination light to a display panel of the LCD device. The backlight module must be property controlled so as to produce high-quality image displayed on the LCD device. Backlight dimming is one of the techniques for improving the contrast and quality of the image displayed on the display panel. As demands for increasingly high-quality display device, it has grown a need for further improving performance of backlight dimming technique on the display device.

Nothing herein should be construed as an admission of knowledge in the prior art of any portion of the present disclosure.

SUMMARY

A display device with a backlight module and a method thereof that are capable of improving a display quality of the display device are introduced.

The display device may include a backlight module and a control circuit, in which the backlight module includes a plurality of lighting units. The control circuit is configured to divide an input image to a plurality of blocks, and calculate a backlight parameter of each of the blocks, wherein each of the backlight parameters corresponds to one of the lighting units respectively for controlling brightness of the corresponding lighting unit, and each of the backlight parameters comprises a plurality of duty cycles. The control unit is further configured to calculate a first duty cycle shift and a second duty cycle shift according to the plurality of duty cycles in the backlight parameter of each of the plurality of blocks, and determine a maximum duty cycle among the plurality of duty cycles, a minimum duty cycle among the plurality of duty cycles, and a duty cycle mean of the plurality of duty cycles. The control circuit is further configured to calculate a first weight value and a second weight value according to the maximum duty cycle, the minimum duty cycle, and the duty cycle mean, and calculate a peaking duty cycle according to the plurality of duty cycles, the first duty cycle shift, the second duty cycle shift, the first weight value and the second weight value. The control circuit is further configured to generate an output backlight parameter according to the peaking duty cycle, wherein the corresponding lighting unit of the backlight module is driven according to the output backlight parameter.

The method that is adapted to a display device may include steps of dividing an input image to a plurality of blocks, and calculate a backlight parameter of each of the blocks, wherein each of the backlight parameters corresponds to one of the lighting units respectively for controlling brightness of the corresponding lighting unit, and each of the backlight parameters comprises a plurality of duty cycles, calculating a first duty cycle shift and a second duty cycle shift according to the plurality of duty cycles in the backlight parameter of each of the plurality of blocks; determining a maximum duty cycle among the plurality of duty cycles, a minimum duty cycle among the plurality of duty cycles, and a duty cycle mean of the plurality of duty cycles; calculating a first weight value and a second weight value according to the maximum duty cycle, the minimum duty cycle, and the duty cycle mean; calculating a peaking duty cycle according to the plurality of duty cycles, the first duty cycle shift, the second duty cycle shift, the first weight value and the second weight value; and generating an output backlight parameter according to the peaking duty cycle, wherein the corresponding lighting unit of the backlight module is driven according to the output backlight parameter.

In some embodiments, the backlight parameters for controlling the backlight module of the display device are adjusted according to the first weight value and the second weight value, in which the first and the second weight values are calculated according to a maximum duty cycle, a minimum duty cycle, a duty cycle mean of a plurality of duty cycles in each backlight parameter. The first weight value may indicate a contrast of the input image and the second weight value may indicate a brightness change of the input image. In this way, the backlight parameters are effectively adjusted according to the content of the input image, and the quality of the image displayed on the display device is improved. In addition, each of the backlight parameters may further include a current value for controlling brightness of the backlight module, wherein the current value is adjusted when a peaking duty cycle is greater than a preset duty cycle. In this way, the backlight module is efficiently controlled even if the peaking duty cycle is more than 100%.

To make the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Figure 1:
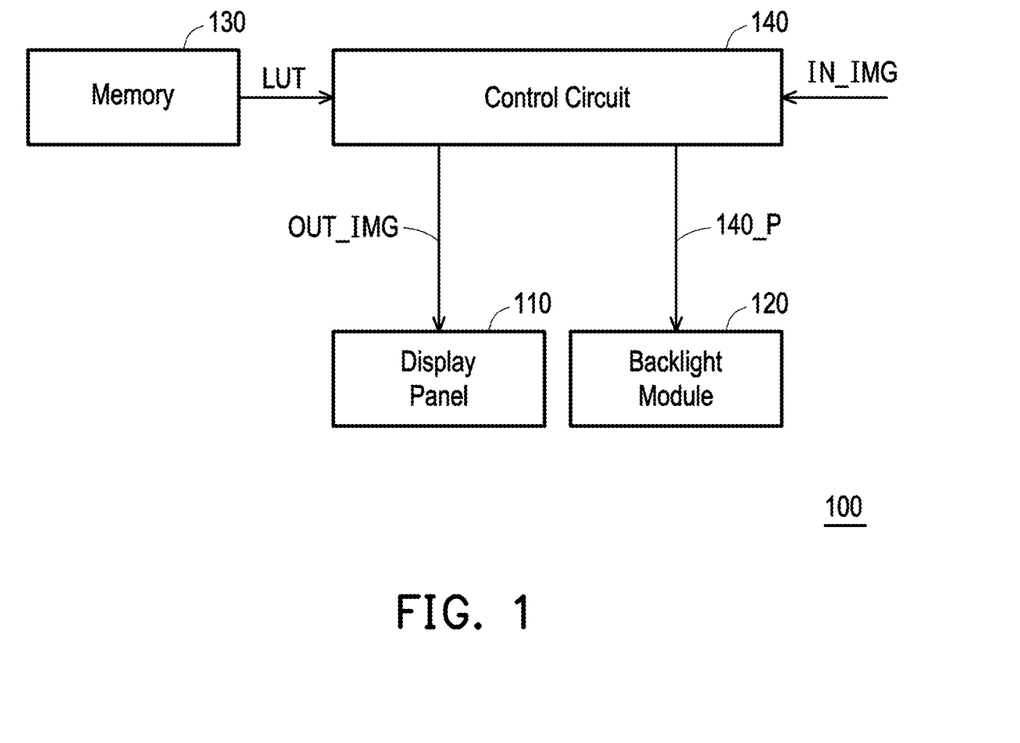
FIG. 1 is a schematic diagram illustrating a display device in accordance with some embodiments.

Referring to FIG. 1, a display device 100 that includes a display panel 110, a backlight module 120, a memory 130 and a control circuit 140 is illustrated in accordance with some embodiments. The display panel 110 is configured to display image data of an output image OUT_IMG which is outputted by the control circuit 140. The display panel 110 may be a liquid crystal display (LCD) panel such as a fringe field switching (FFS) panel, an in-plane switching (IPS) panel, a twisted nematic (TN) panel and a vertical alignment (VA) panel which is not limited in the disclosure.

The backlight module 120 may be divided into a plurality of lighting units (or blocks) that may individually illuminate the display panel 130 under a control of backlight parameter 140_P outputted from the control circuit 140. The backlight module 120 may be controlled by at least one pulse-width modulation (PWM) control signal having a duty cycle which represents a ratio of illumination time to an entire period of the PWM control signal. In some embodiments, each of the lighting units (not shown) include a plurality of light sources, in which the light sources are respectively controlled by the duty cycles of PWM control signals. The light sources of backlight module 120 may be light-emitting diodes (LEDs), but the disclosure is not limited thereto.

The backlight parameters 140_P may include the duty cycles corresponding to the light sources in each lighting unit of the backlight module 120. Each backlight parameter 140_P is used to adjust brightness of a corresponding lighting unit. For example, the backlight parameter 140_P includes a duty cycle of each light source, in which 100% corresponds to the maximum brightness and 0% corresponds to the minimum brightness. In some embodiments, each backlight parameter further includes a current value, in which the brightness of each light source may be adjusted according the current value. For example, as the current value applied to a light source increase, the brightness of the light source increases.

Figure 3:
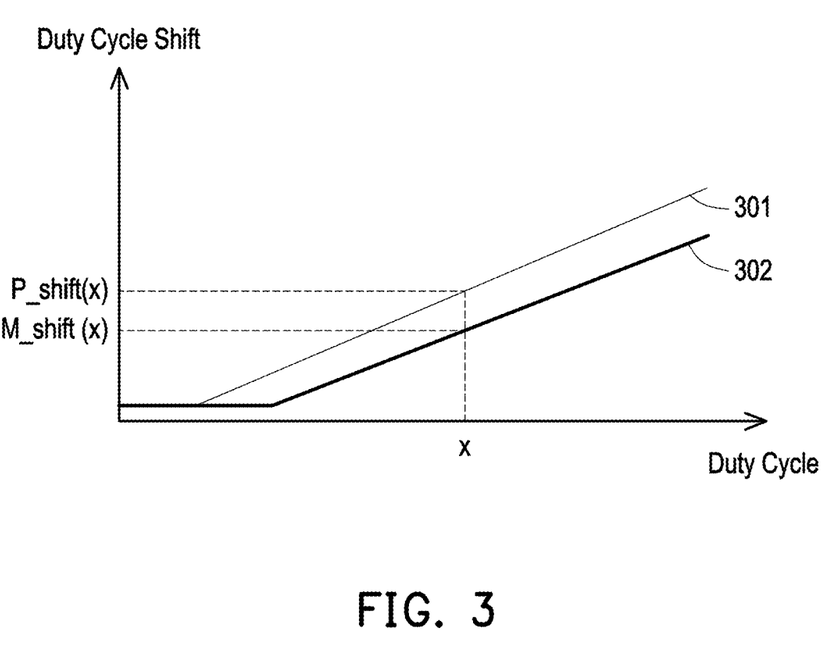
FIG. 3 is a diagram illustrating a relation between the input duty cycle and a duty cycle shift in accordance with some embodiments.

The control circuit 140 may receive an input image IN_IMG and perform at least one operation on the input image IN_IMG to generate the output image OUT_IMG. The at least one operation may include operations that improve the quality and/or reduce noises of input image IN_IMG, thereby improving the quality of the image displayed on the display panel 110. The control circuit 140 is further configured to determine the backlight parameters 140_P for controlling the backlight module 120. For example, the control circuit 140 may determines clock cycles and current values included in backlight parameters for each light sources of each light units of the backlight module 120. In some embodiments, the control circuit 140 determines the backlight parameters 140_P based on the input image IN_IMG and at least one look-up-table (LUT) stored in the memory 130. The LUTs stored in the memory 130 may include a mean-shift LUT and a peaking-shift LUT which are illustrated in FIG. 3.

In some embodiments, the display device 100 further includes a backlight driver (not show) that is configured to drive the backlight module 120 according to the backlight parameters 140_P. The control circuit 140 may be coupled to the backlight driver or may be included in the backlight driver of the display device 100. In some embodiments, the display device 100 further includes a timing controller (not shown) that generates a synchronization control signal (i.e., vertical synchronization signal), in which the backlight module 120 may be driven in synchronization with the synchronization control signal. The control circuit 140 may be coupled to the timing controller or may be included in the timing controller of the display device 100.

Figure 2:
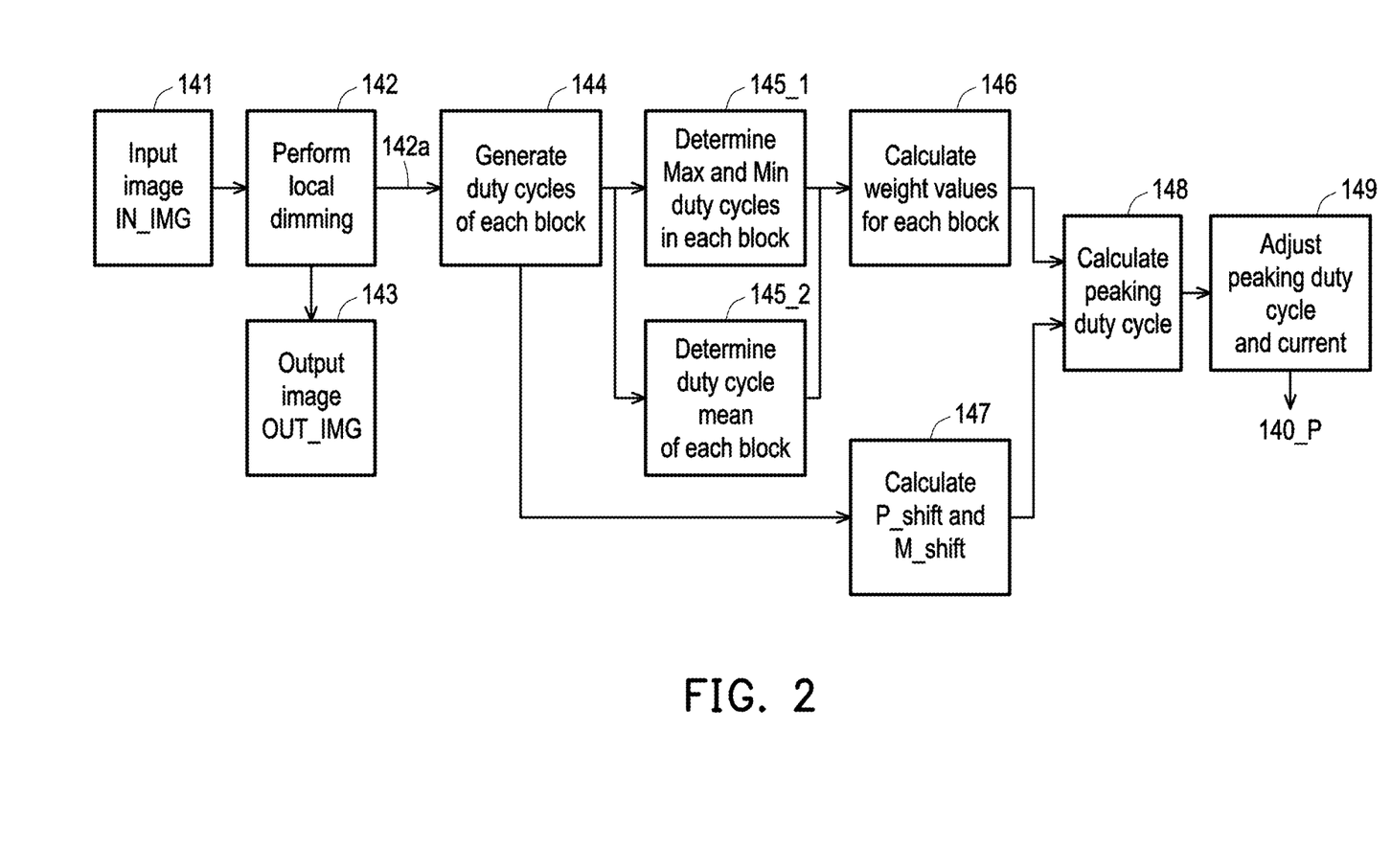
FIG. 2 is a flowchart diagram illustrating a method adaptable to control a backlight module of a display device in accordance with some embodiments.

Referring to FIG. 2, a flowchart diagram of a method for the control circuit 140 is illustrated in accordance with some embodiments. Each block illustrated in FIG. 2 may be implemented by hardware (e.g., a digital image processor), software (e.g., computer programs) or their combinations. In blocks 141 through 143, the control circuit 140 receives the input image IN_IMG and performs a local dimming operation based on the input image IN_IMG to generate the output image OUT_IMG. The control circuit 140 may perform at least one processing operations on input image IN_IMG to generate the output image OUT_IMG. The disclosure does not intend limit the processing operations. For example, the processing operations may be performed to reduce noises of the input images, to improve the quality of the image and/or any other purposes. The input image IN_IMG may include a plurality of pixels, and each pixel includes grey levels such as red, green, and blue grey levels. The output image OUT_IMG is displayed on the display panel 110 of the display device 100.

In block 142, the control circuit 140 is further configured to generate backlight parameters 142a according to grey levels of the pixels of the input image IN_IMG. In some embodiments, the control circuit 140 is configured to divide the input image IN_IMG to a plurality of blocks (not shown), wherein each block includes multiple pixels of the input image IN_IMG. A size of each block is determined according to designed needs, and is not limited to any particular value. The control circuit 140 may calculate a backlight parameter 142a of each of the blocks of the input image IN_IMG according to grey levels of pixels in the block. Each backlight parameter 142a corresponds to a lighting unit of the backlight module 120, and each backlight parameter 142a is configured to control brightness of the corresponding lighting unit. In some embodiments, each backlight parameter 142a includes at least one duty cycle of a pulse with modulation (PWM) signal that is used to control light sources included in the corresponding lighting unit of the backlight module 120. For example, the backlight parameter 142a of a block may include a duty cycle for each light source, in which the duty cycle of 100% corresponds to the maximum brightness of the light source and the duty cycle of 0% corresponds to the lowest brightness of the light source. In general, the duty cycle is large when the pixels in the corresponding block are bright; and the duty cycle is small when the pixels are dark. In some embodiments, the duty cycle is recorded in a 8-bit value, and the value of the duty cycle is in a range from 0 to 255.

In some embodiments, each backlight parameter 142a corresponds to one of blocks of the input image IN_IMG and corresponds to one of lighting units of the backlight module 120. Each backlight parameter 142a includes duty cycles for controlling the light sources in corresponding lighting unit of the backlight module 120. In block 144, the control circuit 140 generates the duty cycles of each block based on the backlight parameter 142a outputted from the block 142. In block 145_1 and 145_2, for each block of the input image IN_IMG, the control circuit 140 calculates a maximum duty cycle among the duty cycles of the block, a minimum duty cycle among the duty cycles of the block, and a mean duty cycle of the duty cycles of the block. For example, the maximum duty cycle duty_max, the minimum duty cycle duty_min and the mean duty cycle duty_mean of a block having size of n*n, where n is a positive integer, are calculated according to the equations (1) through (3):

$$\text{duty\_max} = \max(1:n*n) \qquad (1)$$

$$\text{duty\_min} = \min(1:n*n) \qquad (2)$$

$$\text{duty\_mean} = \text{sum}(1:n*n)/(n*n) \qquad (3)$$

In block 146, the control circuit 140 calculates weight values w1 and w2 according to the maximum duty cycle duty_max, the minimum duty cycle duty_min and the mean duty cycle duty_mean. For example, when the duty cycles are recorded in 8-bit values, the weight values w1 and w2 are calculated according to the following equations (4) and (5):

$$w1 = (\text{duty\_max} - \text{duty\_min})/256 \qquad (4)$$

$$w2 = (\text{duty\_mean} - \text{duty\_min})/256 \qquad (5)$$

As shown in the equations (5) and (6), the weight value w1 is calculated according to a difference between the maximum duty cycle duty_max and the minimum duty cycle duty_min. The difference between the maximum duty cycle duty_max and the minimum duty cycle duty_min may indicate a contrast of pixels in the input image IN_IMG. In addition, the weight value w2 is calculated according to a difference between the mean duty cycle duty mean and the minimum duty cycle duty_min. The difference between the mean duty cycle duty_mean and the minimum duty cycle duty_min may indicate brightness change of pixels in the input image IN_IMG. In this way, the adjusted backlight parameter 140_P may by adapted according to the content of the input image IN_IMG.

In block 147, the control circuit 140 determines a peaking shift P_shift and a mean shift M_shift (also referred to as a first duty cycle shift and a second duty cycle shift) according to the duty cycles (also referred to as input duty cycles) provided from block 144. In some embodiments, the control circuit 140 determines the peaking shift P_shift and the mean shift M_shift according to a peaking LUT and a mean LUT which are pre-stored in a memory (i.e., memory 130 of the display device 100 in FIG. 1). The peaking-shift LUT may record a relation between duty cycles (i.e., input duty cycles) and corresponding peaking shifts P_shift; and the mean LUT may record a relation between the duty cycles and corresponding mean shifts M_shift.

FIG. 3 is a diagram illustrating exemplary peaking-shift LUT 301 and mean-shift LUT 302 in accordance with some embodiments. The vertical axis of the diagram shown in FIG. 3 shows the duty cycle shifts (i.e., peaking shift and mean shift) and the horizontal axis of the diagram shown in FIG. 3 shows the input duty cycles. As shown in FIG. 3, when the input duty cycle is x, the control circuit 140 may use the LUTs 301 and 302 to determine the corresponding peaking shift P_shift (x) and the mean peaking shift P_shift (x). In this way, the control circuit 140 may determine the peaking shift P_shift and the mean shift M_shift according to the input duty cycle inputted to the block 147.

Returning to FIG. 2, in block 148, the control circuit 140 is configured to calculate a peaking duty cycle duty_pk according to the input duty cycle x, the peaking shift P_shift, the mean shift M_shift, and the weight values w1 and w2. For example, the control circuit 140 calculates the peaking duty cycle duty-pk according to the following equation (6), in which x is the input duty cycle; w1 and w2 are weight values; P_shift (x) is the peaking shift corresponding to the input duty cycle x; and M_shift(x) is the mean shift corresponding to the input duty cycle x:

$$\text{duty\_pk}(x) = x + w1 * P\_shift(x) + w2 * M\_shift(x) \qquad (6)$$

In the example where the duty cycles are recorded as 8-bit values, the maximum value that can be recorded is 255. As shown in equation (6), when the input duty cycle x is large (i.e., 255), it is likely that the peaking duty cycle duty_pk is greater than 255. As such, the calculated peaking duty cycle duty_pk should be adjusted to be with the allowable range (i.e., from 0 to 255). In block 149, the control circuit 140 is configured to adjust the peaking duty cycle and the current value to generate output backlight parameters 140_P. The output backlight parameters 140_P may include output duty cycles and current value that are configured to control brightness of the lighting units of the backlight module 120. In some embodiments, the control circuit 140 is configured to determine whether the peaking duty cycle duty_pk is greater than a first preset duty cycle. When the 8-bit duty cycles are recorded, the first preset duty cycle may be 255 or the duty cycle of 100%, but the disclosure does not intend to limit the first preset duty cycle to any particular value. The first preset duty cycle may be set to the duty cycle of 90%, 80% or any other values based on the designed requirements.

When it determines that the peaking duty cycle duty_pk is not greater than the first preset duty cycle, the control circuit 140 does not adjust the peaking duty cycle duty_pk and the current applied to the light sources of the backlight module 120. As such, the peaking duty cycle duty_pk is set as the output duty cycle and the output backlight parameter 140_P, and the current value of the output backlight parameter 140_P is unchanged.

When it determines that the peaking duty cycle duty_pk is greater than the first preset duty cycle, the control circuit 140 is configured to set the first preset duty cycle as the output duty cycle and the output backlight parameter 140_P and is further configured to adjust the current value according to a difference between the peaking duty cycle duty_pk and the first preset duty cycle. In general, amount of the adjustment current is large when the difference between the peaking duty cycle duty_pk and the first preset duty cycle is large, and vice versa.

Figure 4:
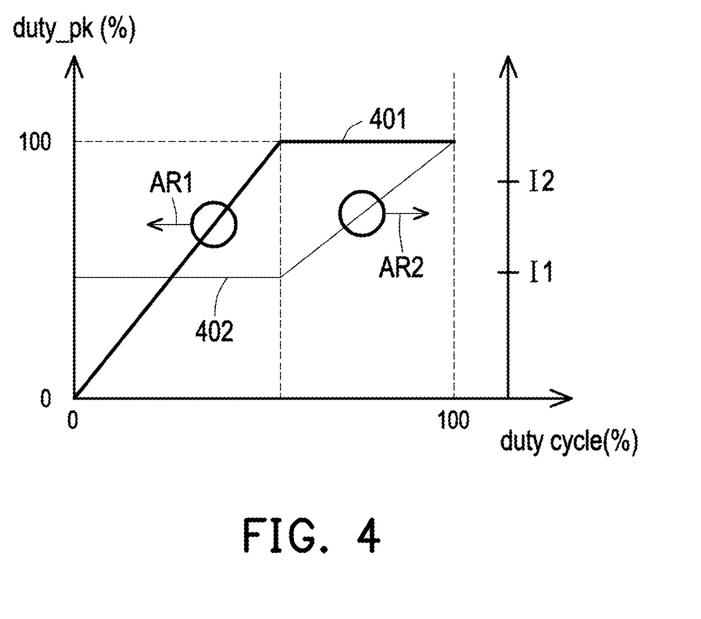
FIG. 4 is a diagram illustrating adjustments of a backlight parameter including duty cycles and a current value in accordance with some embodiments.

FIG. 4 is a diagram illustrating adjustments of peaking duty cycle duty_pk and current I applied to the light sources of the backlight module 120 in accordance with some embodiments. The diagram shown in FIG. 4 includes lines 401 and 402, in which the line 401 illustrates an adjustment of the peaking duty cycle duty_pk, and the line 402 illustrates an adjustment of the current I applied to the light sources of the backlight module 120. As shown in FIG. 4, when the peaking duty cycle duty_pk is smaller than the preset duty cycle, the peaking duty cycle duty_pk and the current are not adjusted. When the peaking duty cycle duty_pk is greater than the preset duty cycle, the peaking duty cycle duty_pk is set to the preset duty cycle of 100%, and the current I is adjusted according to the difference between the peaking duty cycle duty_pk and the preset duty cycle of 100%. An arrow AR2 shown in FIG. 4 illustrates the adjustment of the current I when the peaking duty cycle duty_pk is greater than the preset duty cycle. As an example, the current I applied to a light source of the backlight module 120 may be adjusted from a current value I1 to a current value I2 when the peaking duty cycle duty_pk corresponding to the light source is greater than the preset duty cycle. A difference between the current value I1 and the current value I2 is determined according to the difference between the peaking duty cycle duty_pk and the preset duty cycle of 100%. The diagram shown in FIG. 4 further shows an arrow AR1 which indicates the shift between the input duty cycle (i.e., in block 144 of FIG. 2) and the peaking duty cycle duty_pk (i.e., in block 148 of FIG. 2). As the current I and the peaking duty cycle duty_pk are adjusted in block 148, the output duty cycle in the output backlight parameter 140_JP are within the allowable range (i.e., 0 to 255) while the brightness of the light sources of the backlight modules are controlled to be the desired level. The control circuit 140 outputs an output backlight parameter 140_P including the current value and the output peaking duty cycle to the backlight module 120 to control the light sources of the lighting units in backlight module 120.

In some embodiments, the control circuit 140 is further configured to determine whether the input duty cycles from the block 144 is smaller than a second preset duty cycle. When an input duty cycle is smaller than the second preset duty cycle, the control circuit 140 does not adjust the input duty cycle and directly output the input duty cycle as the backlight parameter 140_P. In this way, when pixels of a block are too dark, the control circuit 140 does not adjust the duty cycle of lighting unit corresponding to the block. As a result, the contrast of the image displayed on the display panel 110 is improved.

Figure 5A:
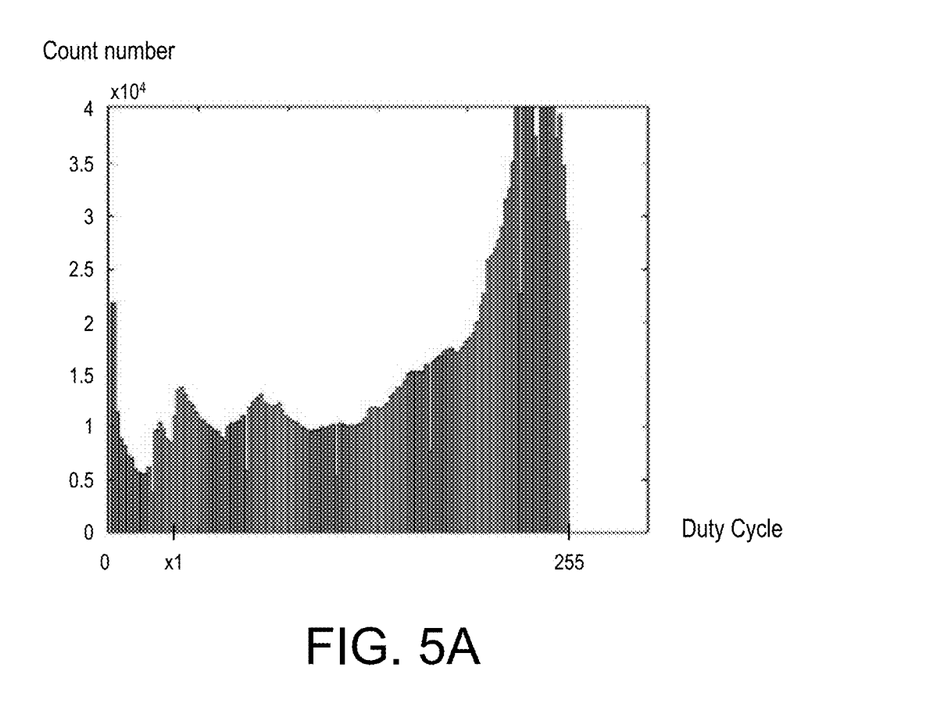
FIG. 5A and FIG. 5B illustrate exemplary duty cycle histograms before and after an adjustment in accordance with some embodiments.
Figure 5B:
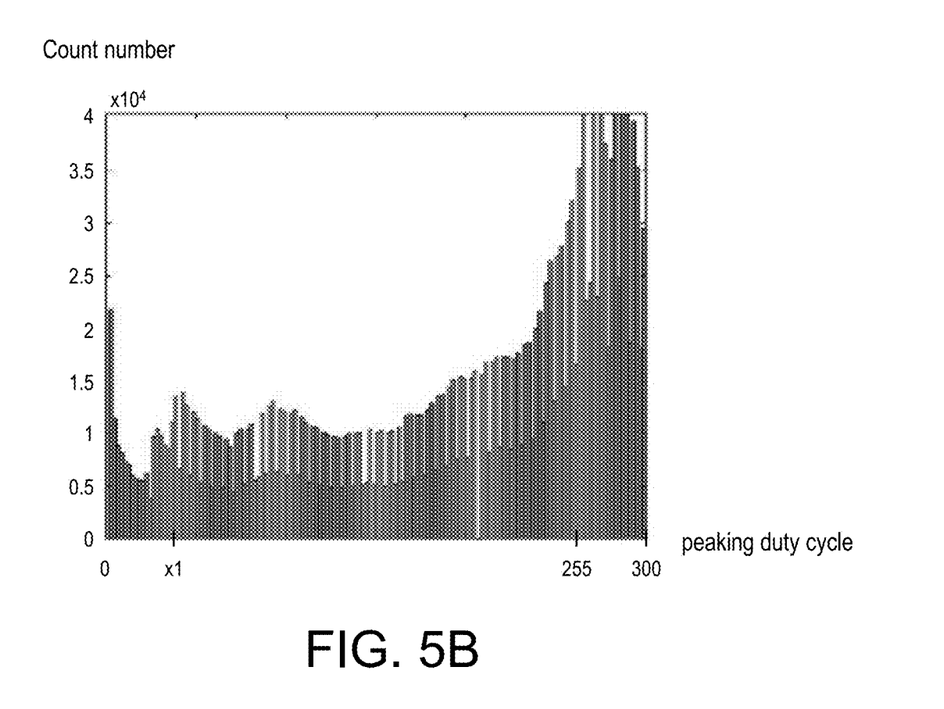

FIG. 5A illustrates a histogram of the input duty cycles in the backlight parameter 142a; and FIG. 5B illustrates a histogram of the peaking duty cycles in accordance with some embodiments. In FIG. 5A and FIG. 5B, the duty cycle x1 indicates a second preset duty cycle, and the control circuit 140 is configured to not adjust the input duty cycles within the range from 0 to x1. In other words, the duty cycles in the range from 0 to x1 in FIG. 5A and FIG. 5B are identical. The input duty cycles that are within the range from to 255 are used to calculate the peaking duty cycles according to the equations (1) through (6) above. In the exemplary histogram shown in FIG. 5B, the peaking duty cycles are the range from x1 to 300 which is outside the allowable range (0 to 255) of the 8-bit values. In FIG. 5B, the peaking duty cycles in the range from 250 to 300 will be adjusted to the preset duty cycle of 255 (or 100%), and the current applied to the light source corresponding to the peaking duty cycles in the range from 250 to 300 will be adjusted. The detailed description regarding the adjustments of the peaking duty cycles and the current applied to the light sources of the backlight module 120 are described in association with FIG. 4.

Figure 6:
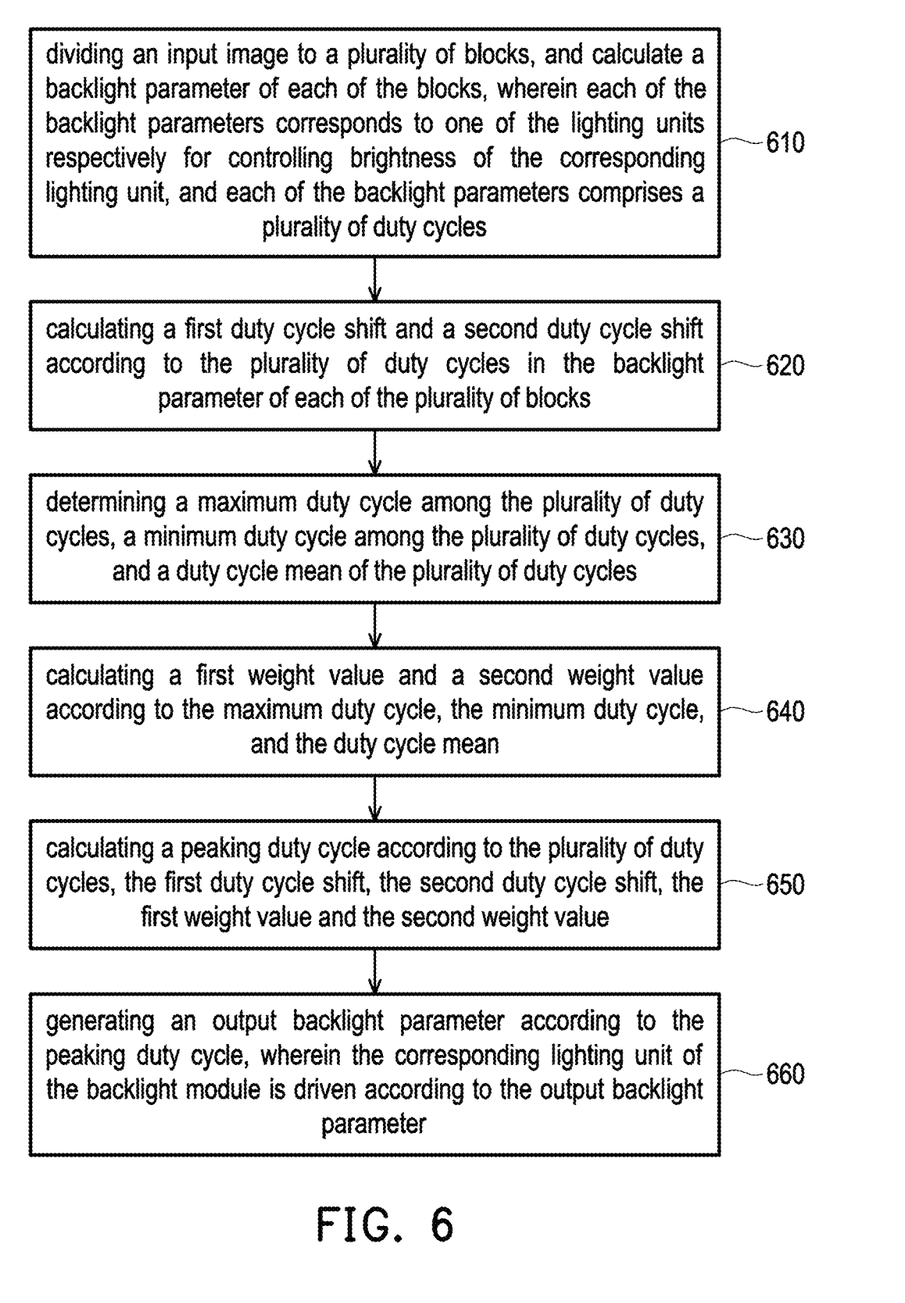
FIG. 6 is a flowchart diagram illustrating a method adapted to a display device including a backlight module in accordance with some embodiments.

FIG. 6 is a flowchart diagram illustrating a method adapted to a display device including a backlight module in accordance with some embodiments. In block 610, an input image is divided to a plurality of blocks, and a backlight parameter of each of the blocks is calculated, wherein each of the backlight parameters corresponds to one of the lighting units respectively for controlling brightness of the corresponding lighting unit, and each of the backlight parameters comprises a plurality of duty cycles. In block 620, a first duty cycle shift and a second duty cycle shift are calculated according to the plurality of duty cycles in the backlight parameter of each of the plurality of blocks. In block 630, a maximum duty cycle among the plurality of duty cycles, a minimum duty cycle among the plurality of duty cycles, and a duty cycle mean of the plurality of duty cycles are determined. In block 640, a first weight value and a second weight value are calculated according to the maximum duty cycle, the minimum duty cycle, and the duty cycle mean. In block 650, a peaking duty cycle is calculated according to the plurality of duty cycles, the first duty cycle shift, the second duty cycle shift, the first weight value and the second weight value. In block 660, an output backlight parameter is generated according to the peaking duty cycle, wherein the corresponding lighting unit of the backlight module is driven according to the output backlight parameter.

In some embodiments, the input image is divided into a plurality of blocks and the backlight parameter of each of the blocks are calculated. The backlight parameters are further adjusted according to the weight values, in which the weight values may indicate contrast and brightness change in the input images. In this way, the backlight parameters are effectively adjusted according to the content of the input image. Furthermore, each of the backlight parameters may further include a current value for controlling brightness of the backlight module, wherein the current value is adjusted when a peaking duty cycle is greater than a preset duty cycle (i.e., duty cycle of 100%). In this way, the backlight module is efficiently controlled even if the peaking duty cycle is more than 100%.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A display device, comprising:
   a backlight module, comprising a plurality of lighting units;
   a control circuit, configured to:
      divide an input image to a plurality of blocks, and calculate a backlight parameter of each of the blocks, wherein each of the backlight parameters corresponds to one of the lighting units respectively for controlling brightness of the corresponding lighting unit, and each of the backlight parameters comprises a plurality of duty cycles;
      calculate a first duty cycle shift and a second duty cycle shift according to the plurality of duty cycles in the backlight parameter of each of the plurality of blocks;
      determine a maximum duty cycle among the plurality of duty cycles, a minimum duty cycle among the plurality of duty cycles, and a duty cycle mean of the plurality of duty cycles;
      calculate a first weight value and a second weight value according to the maximum duty cycle, the minimum duty cycle, and the duty cycle mean;
      calculate a peaking duty cycle according to the plurality of duty cycles, the first duty cycle shift, the second duty cycle shift, the first weight value and the second weight value; and
      generate an output backlight parameter according to the peaking duty cycle, wherein the corresponding lighting unit of the backlight module is driven according to the output backlight parameter.

2. The display device of claim 1, wherein
   the output backlight parameter of each of the plurality of blocks comprises an output duty cycle and a current value,
   the control circuit is further configured to:
      determine whether each of the plurality of peaking duty cycles are greater than a preset duty cycle; and
      in response to determining that a peaking duty cycle is greater than the preset duty cycle, set the preset duty cycle as the output duty cycle and adjust the current value to generate an adjusted current value; and in response to determining that the peaking duty cycle is smaller than the preset duty cycle, set the peaking duty cycle as the output duty cycle and keep the current value unchanged.

3. The display device of claim 2, wherein an adjustment amount of the current value is determined according to a difference between the peaking duty cycle and the preset duty cycle.

4. The display device of claim 1, wherein the input image comprises a plurality of pixels, and the control circuit determines the backlight parameters correspond to the lighting units according to grey levels of the plurality of pixels.

5. The display device of claim 1, wherein the first duty cycle shift is determined according to a first look up table (LUT), wherein the first LUT records a relation between first duty cycle shifts and duty cycles, and the second duty cycle shift is determined according to a second LUT, wherein the second LUT records a relation between second duty cycle shifts and the duty cycles.

6. The display device of claim 1, wherein the control circuit averages the plurality of duty cycles to obtain the duty cycle mean.

7. The display device of claim 1, wherein the control circuit is further configured to:

determine the first weight value according to a difference between the maximum duty cycle and the minimum duty cycle; and determine the second weight value according to a difference between the duty cycle mean and the minimum duty cycle.

8. The display device of claim 1, wherein the control circuit is further configured to:

multiply the first weight value with the first duty cycle shift to generate a first shift value;

multiply the second weight value with the second duty cycle shift to generate a second shift value; and add the first shift value and the second shift value to the backlight parameter to generate the peaking duty cycle.

9. The display device of claim 1, wherein each of the plurality of lighting units comprises at least one light emitting diode, and the output backlight parameter controls brightness of the at least one light emitting diode in the corresponding lighting unit.

10. The display device of claim 1, wherein the control circuit is the timing controller of the display device.

11. A method adapted to a display device including a backlight module, the method comprising:

dividing an input image to a plurality of blocks, and calculate a backlight parameter of each of the blocks, wherein each of the backlight parameters corresponds to one of the lighting units respectively for controlling brightness of the corresponding lighting unit, and each of the backlight parameters comprises a plurality of duty cycles;

calculating a first duty cycle shift and a second duty cycle shift according to the plurality of duty cycles in the backlight parameter of each of the plurality of blocks;

determining a maximum duty cycle among the plurality of duty cycles, a minimum duty cycle among the plurality of duty cycles, and a duty cycle mean of the plurality of duty cycles;

calculating a first weight value and a second weight value according to the maximum duty cycle, the minimum duty cycle, and the duty cycle mean;

calculating a peaking duty cycle according to the plurality of duty cycles, the first duty cycle shift, the second duty cycle shift, the first weight value and the second weight value; and generating an output backlight parameter according to the peaking duty cycle, wherein the corresponding lighting unit of the backlight module is driven according to the output backlight parameter.

12. The method of claim 11, wherein the output backlight parameter of each of the plurality of blocks comprises an output duty cycle and a current value, and generating the output backlight parameter according to the peaking duty cycle comprises:

determining whether each of the plurality of peaking duty cycles are greater than a preset duty cycle (100%); and in response to determining that a peaking duty cycle is greater than the preset duty cycle, setting the preset duty cycle as the output duty cycle and adjust the current value to generate an adjusted current value; and in response to determining that the peaking duty cycle is smaller than the preset duty cycle, setting the peaking duty cycle as the output duty cycle and keep the current value unchanged.

13. The method of claim 11, wherein an adjustment amount of the current value is determined according to a difference between the peaking duty cycle and the preset duty cycle.

14. The method of claim 11, wherein the input image comprises a plurality of pixels, and the backlight parameters are determined correspond to the lighting units according to grey levels of the plurality of pixels.

15. The method of claim 11, wherein the first duty cycle shift is determined according to a first look up table (LUT), wherein the first LUT records a relation between first duty cycle shifts and duty cycles, and the second duty cycle shift is determined according to a second LUT, wherein the second LUT records a relation between second duty cycle shifts and the duty cycles.

16. The method of claim 11, wherein the plurality of duty cycles are averaged to obtain the duty cycle mean.

17. The method of claim 11, wherein calculating the first weight value and the second weight value according to the maximum duty cycle, the minimum duty cycle, and the duty cycle mean comprises:

calculating the first weight value according to a difference between the maximum duty cycle and the minimum duty cycle; and calculating the second weight value according to a difference between the duty cycle mean and the minimum duty cycle.

18. The method of claim 11, wherein calculating the peaking duty cycle according to the plurality of duty cycles, the first duty cycle shift, the second duty cycle shift, the first weight value and the second weight value comprises:

multiplying the first weight value with the first duty cycle shift to generate a first shift value;

multiplying the second weight value with the second duty cycle shift to generate a second shift value; and adding the first shift value and the second shift value to the backlight parameter to generate the peaking duty cycle.

19. The method of claim 11, wherein each of the plurality of lighting units comprises at least one light emitting diode, and the output backlight parameter controls brightness of the at least one light emitting diode in the corresponding lighting unit.

* * * * *